PHASE OR FREQUENCY
MODULATOR

INVENTOR.
LEE N. ANDERSON
BY
[signature]
ATTORNEY

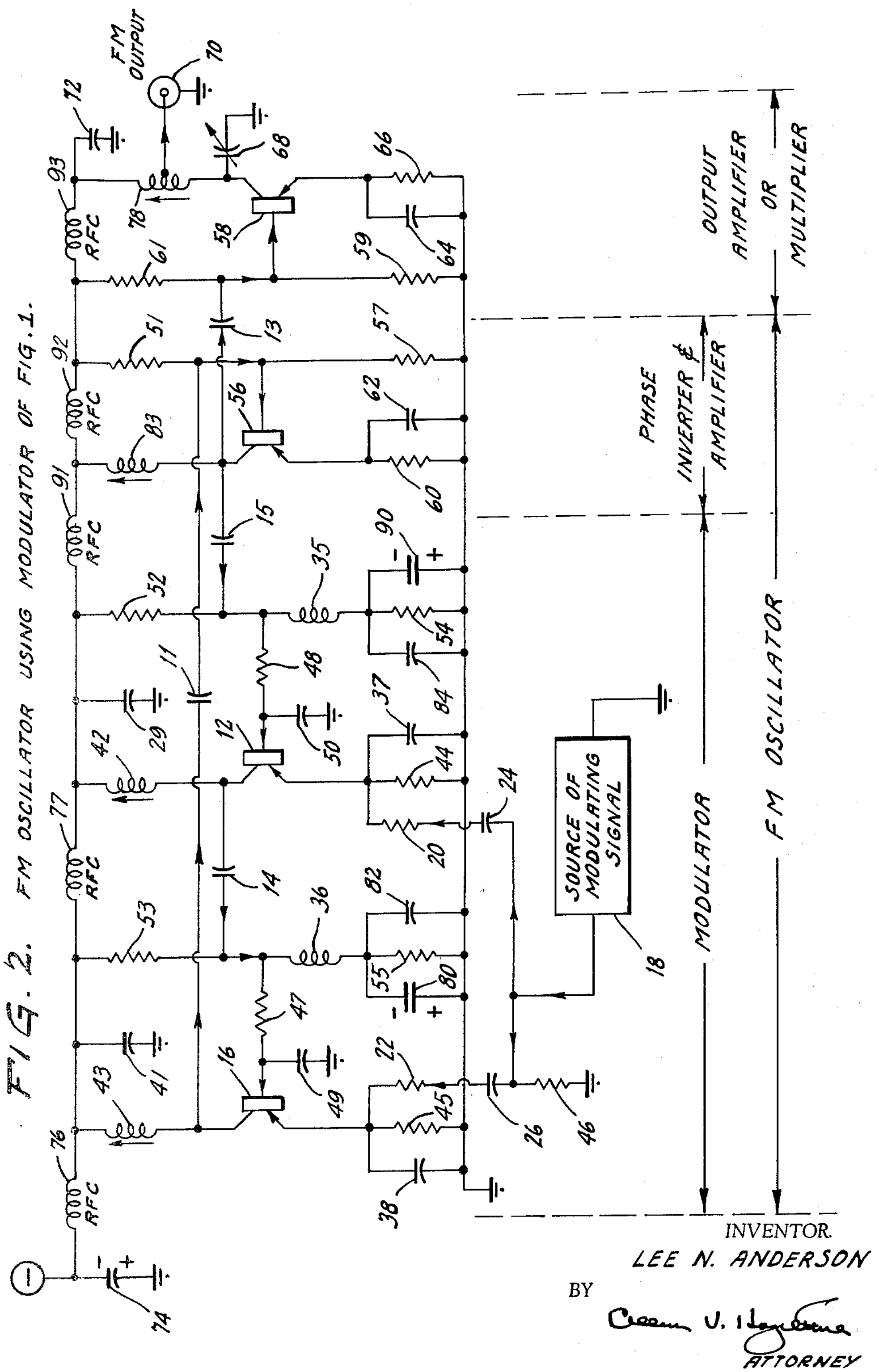
FIG. 2. FM OSCILLATOR USING MODULATOR OF FIG. 1.
INVENTOR.
LEE N. ANDERSON
BY
[signature]
ATTORNEY 3,243,730

PHASE MODULATOR CIRCUITS UTILIZING CASCADED INVERTERS WITH MODULATION APPLIED IN LIKE PHASE TO ALL INVERTERS

Lee N. Anderson, Claymont, Del., assignor to Philco Corporation, Philadelphia, Pa., a corporation of Delaware Filed July 19, 1962, Ser. No. 210,929
13 Claims. (Cl. 332—18)

INTRODUCTION

Figure 1:
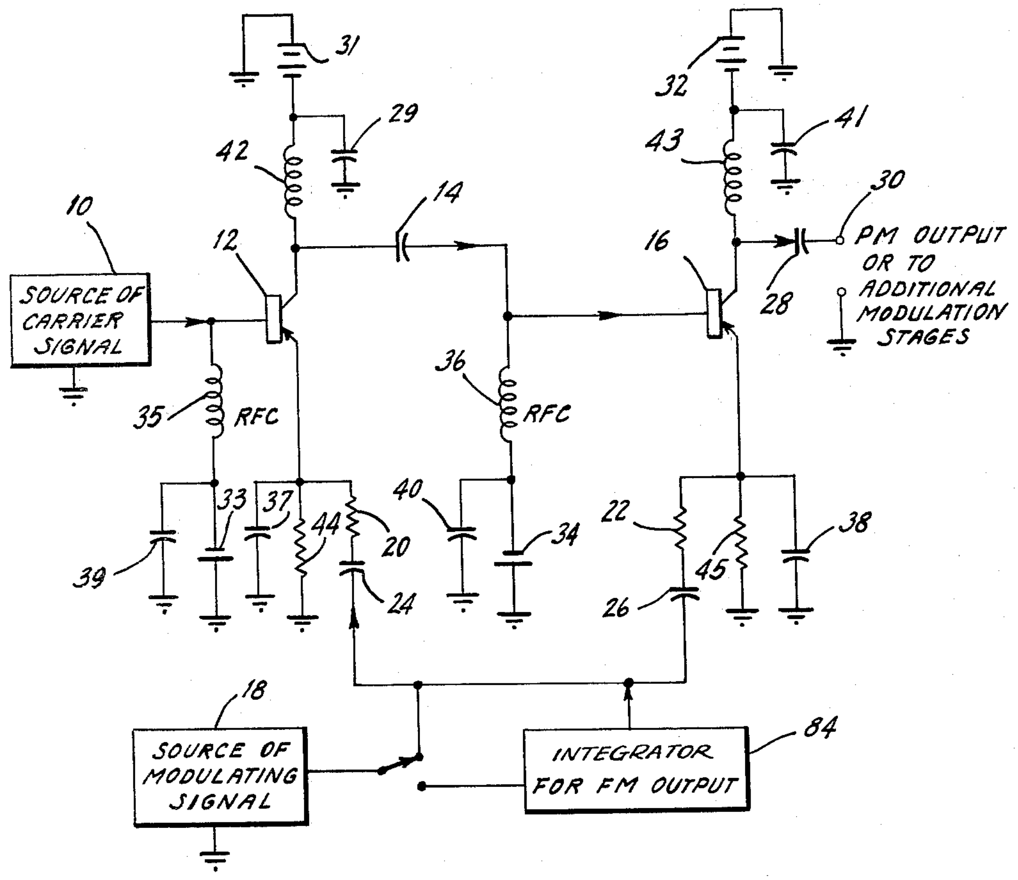

The desirability of obtaining linear phase or frequency modulators—i.e., phase or frequency modulators which concomitantly produce little or no amplitude modulation—has long been manifest. Most present phase or frequency modulators are followed by one or more limiter stages which suppress the amplitude modulation which usually accompanies frequency or phase modulation. One phase modulator which can inherently suppress a great deal of the amplitude modulation normally present in the process is shown in the U.S. Patent No. 2,675,523 to Fisk et al., granted April 13, 1954. The Fisk et al. modulator consists of a cascaded series of cathode follower modulating stages wherein a push-pull modulating signal is applied to alternate stages to effect self-cancellation of the generated amplitude modulation. The modulator which is the subject of the present invention is an improved and simplified phase or frequency modulator which inherently suppresses amplitude modulation while advantageously eliminating the need for the phase splitter, separate voltage amplifiers, and alternate capacitive-inductive stages, among other things, which the Fisk et al. arrangement requires. The invention is also shown as part of a practical wideband FM oscillator.

OBJECTS

The objects, then, of this invention are: (1) the provision of a novel and improved phase or frequency modulator, (2) the provision of a phase or frequency modulator which inherently eliminates and cancels amplitude modulation, and (3) the provision of an FM oscillator utilizing the novel modulator of the present invention. Further objects of the present invention will become apparent in conjunction with the following summary and detailed description of the invention and its operation.

SUMMARY

In accordance with the present invention phase modulation is produced in a carrier signal by feeding the carrier signal through an even number of cascaded inverting amplifiers whose individual internal phase shifts are varied by utilizing the modulating signal to vary their bias currents. Amplitude modulation is concomitantly suppressed because the modulating signal varies the bias current of all the inverters in the same direction, but the even number of cascaded inverters serves to produce opposing and thus self-cancelling amplitude variations.

DRAWING

In the drawing, FIG. 1 depicts a phase or frequency modulator according to the invention, and FIG. 2 depicts an FM oscillator utilizing the frequency modulator of the invention. Throughout the drawing elements having like function have been designated with like numerals.

DESCRIPTION.—FIG. 1

FIG. 1 (as well as FIG. 2) depicts an embodiment of the invention wherein PNP transistors are utilized as the amplifying inverters. NPN transistors or any other active elements such as vacuum tubes could be used here with equal facility.

Two transistors are connected in FIG. 1 according to the invention to yield the basic modulator circuit. As shown, any number of stages can be cascaded if a greater degree of phase modulation is desired.

In the following discussions the abbreviation "C" will denote a capacitor, "R" a resistor, "L" an inductor, and "Q" a transistor.

The carrier input signal from source 10 is supplied to the base of Q12. C14 couples the collector of Q12 to the base of Q16. The modulating or intelligence signal from source 18 is coupled through R20 and C24 to the emitter of Q12, and through R22 and C26 to the emitter of Q16. R20 and R22 also provide interstage isolation. The modulated output signal is supplied to terminal 30 through C28. Negative B— potential is supplied to the collectors of the transistors from batteries 31 and 32, while bias batteries 33 and 34 supply the base circuits. Capacitors 39, 40, 29, and 41 are designed to bypass their respective batteries.

The circuit is designed so that the collectors and bases are loaded to present a high impedance to the carrier frequency and a low impedance to the highest modulation frequency, while the emitters are bypassed for the carrier frequency but offer a high impedance to the modulating frequency. Thus L42 and L43 in the collector circuits have had a low impedance at the modulating frequency, but are designed to resonate with the capacitance of the collector to present a high impedance to the carrier frequency. L35 and L36 in the base circuits act as a radio frequency choke to the carrier, but present a low impedance to the modulating frequency. C37 and C38 in the emitter circuits bypass the carrier frequency but act as a high impedance to the modulating frequency.

While the circuit thus far disclosed is a phase modulator, a frequency modulated signal may be obtained at the output by first integrating the modulating signal in integrator 84 as is well known to those conversant with the modulator art.

OPERATION.—FIG. 1

Phase modulation in FIG. 1 is effected as the modulating signal varies the transistor emitter current to vary its internal phase shift, and amplitude modulation is cancelled because there are an even number of transistors whose emitters are driven in phase and whose bases are driven out-of-phase.

*Phase modulation*

More particularly, as modulating signal 18 is applied to the emitters of Q12 and Q16, most of the signal current will reach the transistor because of the comparatively high impedance presented by C37, C38, R44, and R45. When the emitter current of Q12 and Q16 is varied in accordance with the modulating signal, the transistor transition capacitance will similarly vary. (Reference is made to pages 19–24 et seq. of Hunter Handbook of Semiconductor Electronics (2d ed., 1962), for a fuller discussion of the variation of transition capacitance with emitter current.) The signal from source 10 will undergo a variable phase shift in accordance with the variations in transition capacitance, and thus phase modulation is effected. A number of pairs of transistors may be cascaded if greater sensitivity of phase shift v. modulating voltage is desired.

*AM cancellation*

When the modulating signal is applied to the emitters of Q12 and Q16, the bias and hence the gain of each transistor will be (undesirably) varied to produce amplitude modulation in addition to the previously discussed phase modulation. The amplitude modulation produced in Q12 will be 180° out of phase with that produced in Q16, however, since the bases are driven out of phase while the modulating signal is applied in like phase to each emitter, and thus the net effect is that cancellation of amplitude modulation is effected. To effect maximum cancellation according to the invention, an even number of transistor inverters is required.

DESCRIPTION.—FIG. 2

FIG. 2 depicts an operational 30 megacycle frequency modulator which embodies the phase modulator of FIG. 1 and which also generates its own oscillations. Components in FIG. 2 having counterparts in FIG. 1 have been given identical numbers.

The modulator section of FIG. 2 is identical to FIG. 1 with certain minor exceptions to be noted. The output of Q16 is coupled through C11 to the base of the inverting amplifier stage comprising Q56. The output from the collector of Q56 is fed back via C15 to the base of Q12 to complete the internal oscillator circuit. R47, R48, C49 and C50 are placed in the base circuits of Q12 and Q16 in order to adjust the loop gain to approximately unity to prevent squegging (suppression of oscillations). R46 provides a suitable input load to match the output impedance of source 18. In lieu of bias batteries 34 of FIG. 1, voltage dividers 52–54, 53–55, 51–57, and 61–59 are used to bias the bases at the proper level.

The output of Q56 is also fed through C13 to the base of the output stage which includes Q58. If a higher output frequency or greater deviation is desired, a frequency multiplier may be placed before or used in lieu of the output stage.

The output signal from the modulator may be taken from L78, which is suitably tapped to match the impedance of the output load (not shown) to be connected to terminal 70. C68 and L78 are tuned to resonate at the carrier frequency. Isolating chokes 76, 77, 83, 91, 92 and 93, and bypass capacitors 41, 29, 72, 74, 80, 82, 84, and 90 serve to prevent interstage signal coupling and to bypass the power supplies and bias resistors as will be obvious to those skilled in the art.

The modulator of FIG. 2 was successfully operated with components having the following values:

| | |
|---|---|
| **Q12, Q16, Q56, Q58** | Philco 2N502. |
| **R47, R48** | 2.2K. |
| **R44, R45, R60, R66** | 2.7K. |
| **R46** | 50. |
| **R20, R22** | 220. |
| **R52, R53, R54, R55, R51, R57, R61, R59** | 5.6K. |
| **C74** | 50 mf. |
| **C41, C29, C72, C64** | 1000 mmf. |
| **C49, C50** | 22 mmf. |
| **C14, C11, C 13, C15** | 220 mmf. |
| **C38** | 330 mmf. |
| **C80** | 20 mf. |
| **C82, C84, C62** | .01 mf. |
| **C24, C26** | 8 mf. |
| **C68** | Tuned with L78 and capacitance of collector of Q58 to resonate at frequency of carrier signal. |
| **L78** | Tuned with capacitance of collector of Q58 and C68 to resonate at carrier frequency. |
| **L42, L43** | Tuned with capacitance of associated collector to resonate at carrier frequency. |
| **L36, L35** | 10 $\mu$h. |
| Frequency of output | 30 mc. |
| Deviation | ±250 kc. |

OPERATION.—FIG. 2

The circuit of FIG. 2 is a practical and operational frequency-modulator and oscillator utilizing the phase modulator of FIG. 1. The modulating circuit comprising Q12 and Q16 is an integral part of the oscillator which additionally includes inverter Q56. The feedback loop provides its own phase shift to generate a frequency modulated output at the collector of Q56 which is amplified and fed to the output terminals through the buffer stage including Q58.

CONCLUSION

A novel phase modulator which can be easily converted into a frequency modulator, or which can be used as part of an FM oscillator, has been described. The chief advantage of the invention is its ability to inherently cancel amplitude modulation in a novel and simple manner.

The invention is not limited to the specific embodiments and parameters described, but is defined only by the language of the following claims.

I claim:

1. In combination; first and second transistors each having a transition capacitance, a first impedance in its collector circuit and a second impedance in its emitter circuit, means to apply a first signal to the base of said first transistor, means to couple the collector of said first transistor to the base of said second transistor, means to derive an output from the collector of said second transistor, a source of a second signal having a frequency different from that of said first signal, and means for applying said second signal to the emitter of each of said transistors to change the transition capacitance and gain of said first and second transistors by substantially like amounts.

2. The combination of claim 1 wherein said second signal is integrated before application to said emitters.

3. The combination of claim 1 wherein said first signal is a carrier signal and said second signal is a modulating signal.

4. A phase modulator comprising: a first transistor having collector base, and emitter electrodes, a source of carrier signal, means coupling said source of carrier signal to said base electrode, an impedance connected between said emitter and a source of reference potential; a second transistor having collector, emitter, and base electrodes, coupling means connecting the collector of said first transistor to the base of said second transistor, each of said first and second transistors having a transition capacitance, output means coupled to said collector of said second transistor, an impedance connected between said emitter of said second transistor and said source of reference potential; a source of a modulating signal having a lower frequency than said carrier signal, and means coupling said modulating signal to each of said emitter electrodes to change the transition capacitance of said first and second transistors by substantially like amounts.

5. A phase modulator comprising: a first inverter having at least two input leads and at least a single output lead, a source of modulating signal coupled to one of said input leads, a source of carrier signal coupled to another of said input leads, means connected to said output lead and said one input lead to present a high impedance to said carrier signal and a low impedance to said modulating signal, means connected to said other input lead to present a high impedance to said modulating signal and a low impedance to said carrier signal; a second inverter having at least two input leads and at least a single output lead, means coupling said source of modulating signal to one of said input leads in like phase with said first inverter, and means coupling the output lead of said first inverter to another input of said second inverter.

6. In combination:

(a) a pair of phase inverters, each having a transition capacitance, an input terminal, a common terminal, and an output terminal for supplying a phase-inverted version of a signal supplied to said input terminal, (b) means coupling the output terminal of one of said inverters to the input terminal of the other of said inverters, (c) a source of a first signal and means for supplying said first signal to the input terminal of said one inverter, and (d) a source of a second signal having a frequency lower than that of said first signal and means for supplying said second signal in like phase to the respective common terminals of both of said inverters to change the transition capacitance of said first and second inverters by substantially like amounts.

7. The combination of claim 6 wherein said first signal is a carrier signal and said second signal is a modulating signal.

8. The combination of claim 6 wherein said phase inverters each comprise a transistor.

9. The combination of claim 8 wherein the input terminal of each of said inverters comprises the base of said transistor, the common terminal of each of said inverters comprises the emitter of said transistor, and the output terminal of each of said inverters comprises the collector of said transistor.

10. A system for phase-modulating a carrier signal in accordance with a modulating signal, comprising, in combination:

(a) a pair of phase inverting means, each having input, common, and output leads, each arranged to supply at its output lead a phase-inverted version of the signal supplied to its input lead, each also arranged to deviate the phase of the signal at its output lead according to a signal supplied to its common lead, (b) means coupling the output lead of one of said inverting means to the input lead of another of said inverting means, (c) a source of said carrier signal and means for supplying said carrier signal to the input lead of said one of said inverting means, and (d) a source of said modulating signal, said modulating signal having a lower frequency than said carrier signal, and means for supplying said modulating signal in like phase to the common leads of both of said inverting means to deviate the phase of the output of each of said inverters in substantially like amounts.

11. The invention of claim 10 wherein each of said devices is a transistor, and wherein said input, common, and output leads are respectively the base, emitter, and collector of said transistor.

12. The invention of claim 10 wherein an impedance is connected between each of said common leads and a source of reference potential, said carrier signal being applied across said input lead and said source of reference potential, and said modulating signal being applied across said impedance.

13. In combination: a first, second, and third signal phase inverters connected in cascade, said first and second inverters providing an internal phase shift which is a function of the instantaneous amplitude of a signal supplied thereto, means supplying a modulating signal in like phase to said first and second phase inverters to alter the internal phase shift of said inverters, and means connecting the output of said third phase inverter to the input of said first inverter, said means providing a feedback path for causing said three inverters to generate oscillations at a carrier frequency higher than the frequency of said modulating signal.

References Cited by the Examiner

UNITED STATES PATENTS

| | | | |
|---|---|---|---|
| 2,430,126 | 11/1927 | Korman | 332—27 X |
| 2,906,968 | 9/1959 | Montgomery | 332—16 |
| 2,916,565 | 12/1959 | Ensink et al. | 330—28 X |

ROY LAKE, *Primary Examiner.*

A. L. BRODY, *Assistant Examiner.*